US009396672B2

(12) United States Patent
Rensmo

(10) Patent No.: US 9,396,672 B2
(45) Date of Patent: Jul. 19, 2016

(54) SIGN AND SIGN SUSPENSION MEANS

(71) Applicant: Anders Rensmo, Orebro (SE)

(72) Inventor: Anders Rensmo, Orebro (SE)

( * ) Notice: Subject to any disclaimer, the term of this patent is extended or adjusted under 35 U.S.C. 154(b) by 0 days.

(21) Appl. No.: 14/647,854

(22) PCT Filed: Nov. 26, 2013

(86) PCT No.: PCT/SE2013/051388
§ 371 (c)(1),
(2) Date: May 28, 2015

(87) PCT Pub. No.: WO2014/084779
PCT Pub. Date: Jun. 5, 2014

(65) Prior Publication Data
US 2015/0302783 A1 Oct. 22, 2015

(30) Foreign Application Priority Data
Nov. 29, 2012 (SE) ...................................... 1251354

(51) Int. Cl.
*A47G 1/06* (2006.01)
*G09F 13/04* (2006.01)
(Continued)

(52) U.S. Cl.
CPC .............. *G09F 13/0413* (2013.01); *G09F 7/18* (2013.01); *G09F 15/0012* (2013.01); *G09F 15/0018* (2013.01); *G09F 15/0025* (2013.01); *G09F 19/22* (2013.01)

(58) Field of Classification Search
CPC ............ G09F 13/0413; G09F 15/0012; G09F 15/0018; G09F 15/0025; G09F 19/22; G09F 7/18
USPC ............................................................ 40/564
See application file for complete search history.

(56) References Cited

U.S. PATENT DOCUMENTS 871,510 A * 11/1907 Kerr ........................ G09F 13/04 340/815.53
2,073,403 A * 3/1937 Goldberg ............ G09F 15/0012 40/209

(Continued)

FOREIGN PATENT DOCUMENTS

FR 2721426 12/1995
GB 184602 8/1922

(Continued)

OTHER PUBLICATIONS

International Search Report, dated Mar. 11, 2014, from corresponding PCT application.

(Continued)

*Primary Examiner* — Shin Kim
(74) *Attorney, Agent, or Firm* — Young & Thompson

(57) ABSTRACT

A sign, arranged to be mounted hanging from a wall, includes a rear panel (5) and a front panel (3) the peripheries of which are surrounded by a frame (6) in the form of an elongate, unitary or assembled member that runs sweeping about the sign while forming at least one joint (14) at which two ends (12, 13) of the frame meet, the sign being associated with a sign suspension element (16) including a bracket (17; 18) which is extended to reach folded over the frame from the rear panel upon mounting of the sign. The bracket (17; 18) is arranged for coupling to each of the meeting ends (12, 13) of the frame in order to fixate the ends of the frame under the bracket while simultaneously clamping the frame (6) about the sign (1).

13 Claims, 2 Drawing Sheets

Figure 1:
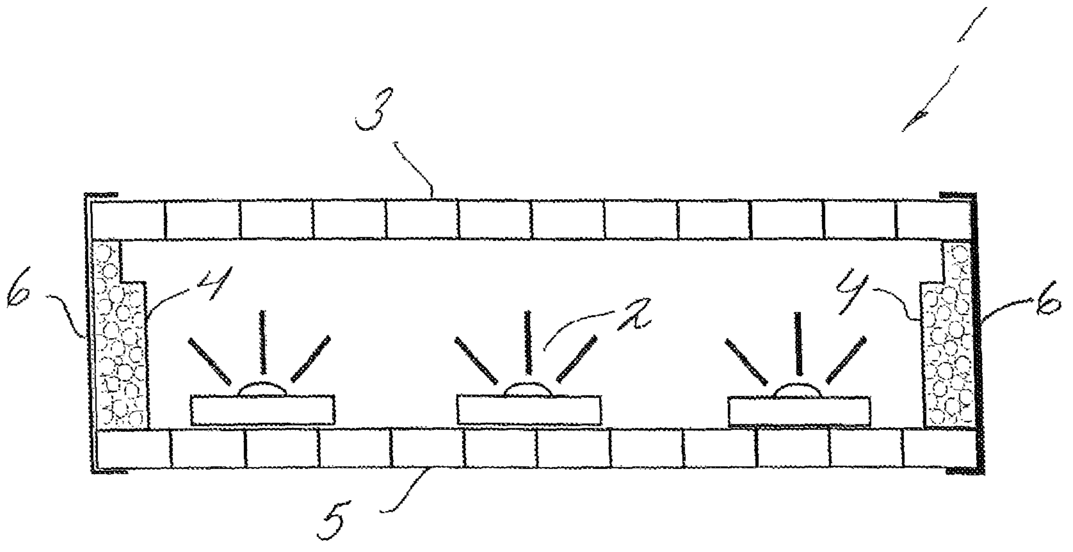

(51) Int. Cl.

| | |
|---|---|
| ***G09F 15/00*** | (2006.01) |
| ***G09F 19/22*** | (2006.01) |
| ***G09F 7/18*** | (2006.01) |

(56) References Cited

U.S. PATENT DOCUMENTS

| | | | | |
|---|---|---|---|---|
| 2,190,557 | A * | 2/1940 | Connell .................... | G09F 1/12 40/718 |
| 3,390,259 | A * | 6/1968 | Angier .................... | F21S 8/088 362/812 |
| 3,396,483 | A * | 8/1968 | Stein ................... | G09F 13/0413 40/549 |
| 4,299,042 | A * | 11/1981 | Rasmussen ............... | G09F 7/00 40/571 |
| 4,674,213 | A * | 6/1987 | Keithley ............. | G09F 15/0012 160/371 |
| 4,863,136 | A | 9/1989 | Sanders | |
| 6,445,373 | B1 * | 9/2002 | Yamamoto ........ | G02F 1/133604 345/102 |
| 7,181,876 | B1 * | 2/2007 | Ahmadi .................. | G09F 13/02 40/564 |
| 7,244,042 | B1 * | 7/2007 | Bieberdorf ................ | B64F 1/18 362/153 |
| 7,752,793 | B2 * | 7/2010 | Labedz ................... | G09F 13/04 40/575 |
| 2007/0193097 | A1 * | 8/2007 | Popowich .............. | G06Q 30/02 40/766 |
| 2014/0290104 | A1 * | 10/2014 | Lindblom ........... | G09F 15/0025 40/559 |

FOREIGN PATENT DOCUMENTS

| | | |
|---|---|---|
| JP | 2010143018 | 7/2010 |
| SE | 0900337 | 7/2010 |
| WO | 2012015352 | 2/2012 |

OTHER PUBLICATIONS

Extended European Search reported dated Apr. 26, 2016, in corresponding European Application No. 13859439.5.

* cited by examiner

SIGN AND SIGN SUSPENSION MEANS

TECHNICAL FIELD OF THE INVENTION

The present invention refers to a sign arranged for mounting suspended on a wall, the sign comprising a rear panel, a front panel and a frame running about the peripheries of the front and rear panels, the frame in the form of an elongate, unitary or composite element sweeping about the sign while forming at least one joint at which two ends of the frame meet, the sign associated with a sign suspension means.

BACKGROUND AND PRIOR ART

The invention originates from a wish to supply signs of low weight intended for suspension from a wall, including light-proof signs lacking internal light sources as well as luminous signs having built-in light sources. In other words, the invention is particularly applicable in signs produced from low weight material such as signs manufactured from cellular plastic elements and channel plastic board, such as the type of signs previously disclosed by the same inventor in PCT/SE2+11/050883, e.g.

In order to even better utilize the potentials of the low weight materials in respect of simplified construction and mounting, the invention provides a sign and a sign suspension means that are configured for cooperation in a specific way.

SUMMARY OF THE INVENTION

More exactly, the invention provides a sign and sign suspension means arranged to cooperate in such way that production of the sign can be made simpler by the fact that the sign suspension means forms a supplement to the sign and completes the same as the sign is mounted in the sign suspension means.

This object of the invention is met in a sign and sign suspension means having the general nature recited above, wherein the sign suspension means is formed with a bracket which in the process of mounting the sign is brought to extend from the rear panel and bent at an angle over the frame, the bracket connectable to each meeting end of the frame to accomplish fixing of the ends of the frame under the bracket, while simultaneously clamping the frame about the sign.

Suspension of the sign and completion of the sign is this way accomplished in one single procedure.

The bracket may be formed with a lip that is folded towards the front panel so as to reach, advantageously, over the front panel for at least a portion thereof, on the forward face of the sign in a mounted state. In this embodiment the connection between the bracket and the frame may include that said lip is arranged for coupling with an edge region of the frame, which edge region is folded to contact the outside of the front panel.

Since in a sign made of low weight material the tension loads applied to the joint in the frame can be expected to be moderate, the connection between the bracket and the frame can be realized in a variety of ways. Accordingly, this connection may be realized in the form of a snap lock, a bolted connection, a riveted joint, a glue joint, a form fitting connection, a clamp connection, a Velcro tape connection or a magnet joint, e.g.

Typically, the sign suspension means comprises an upper and a lower bracket. The upper and lower brackets may be separated for individual mounting onto a wall.

The sign suspension means preferably includes two brackets located opposite to each other, at least one of the brackets configured for joining the ends of the frame, wherein the brackets are mutually connected through a connecting strip that reaches over the rear panel of the sign, and arranged to be attached to the wall.

The sign is formed from a thin plate or strip with folding indications formed in the longitudinal sides to facilitate folding of the strip around the sign. The folding indications are arranged as oppositely positioned notches which upon mounting of the sign are located in the corners of a frame formed from edge regions of the strip, which edge regions are folded towards the front panel as well as towards the rear panel. The frame is produced from metal, light metal or plastic, and the cutouts in the edge regions of the frame are suitably applied as V-shaped cutouts that form mitre joints in the corners of the frame.

The sign is preferably made entirely from low weight materials.

In a preferred embodiment, the sign thus comprises a front panel produced in channel plastic. In a specifically advantageous embodiment also the rear panel is produced in channel plastic. In a sign having built-in light sources, the front and rear panels made in channel plastic can be spaced from each other by means of distance pieces made in cellular plastic or channel plastic. The frame can advantageously be made in thin sheet steel, or from aluminum or a synthetic material which can be permanently shaped by bending.

SHORT DESCRIPTION OF THE DRAWINGS

Figure 2:
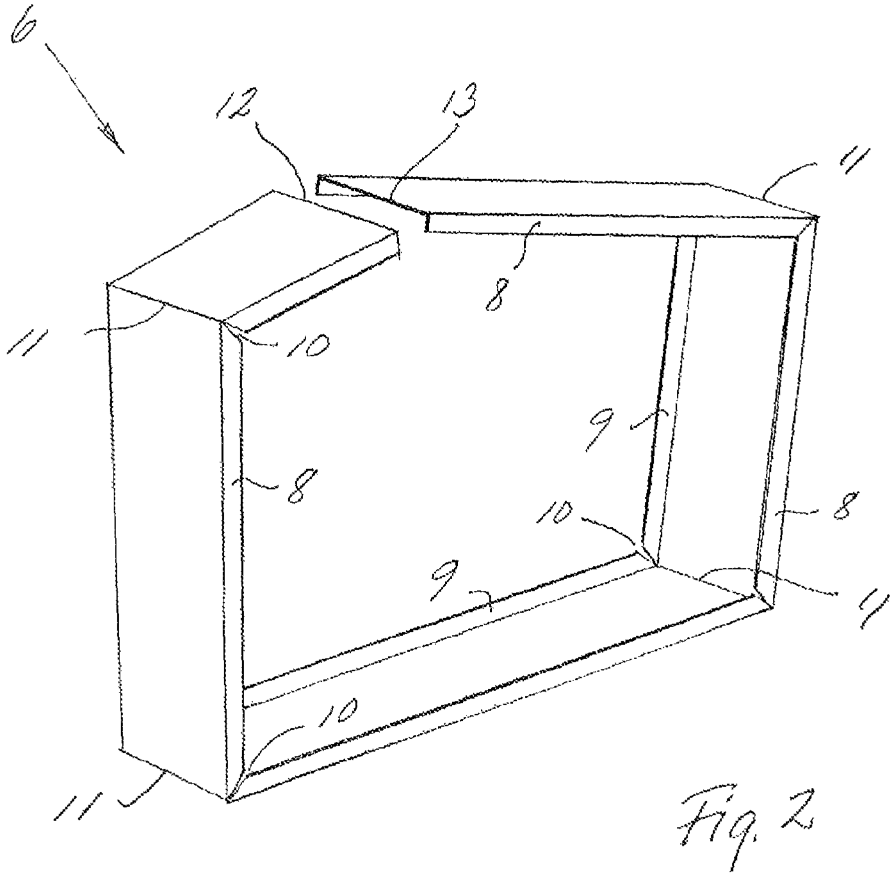
Figure 3:
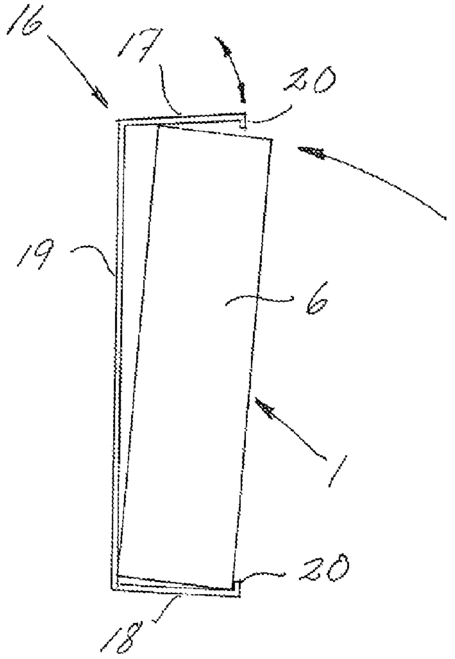
Figure 4:
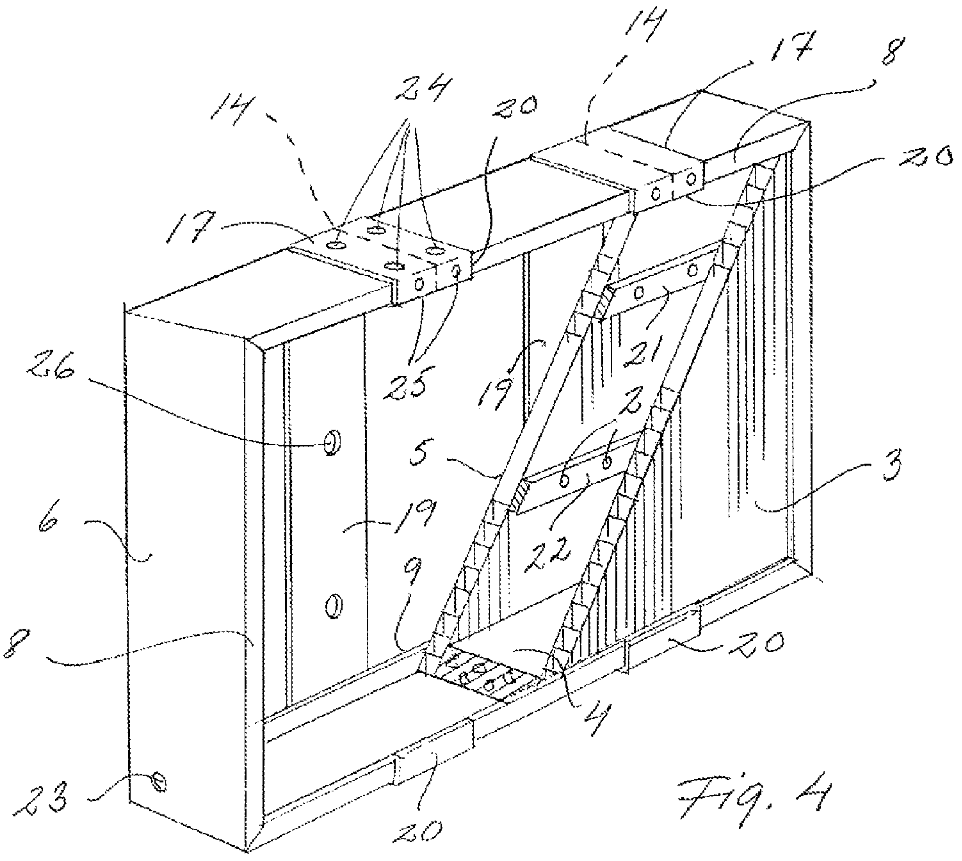

Embodiments of the invention will be further described below with reference made to the accompanying, schematic drawings. The drawings show:

FIG. 1 a sectional view through a light panel sign, assembled from low weight material as known in the art, and including built-in light sources, FIG. 2 a frame adapted to the sign of FIG. 1, FIG. 3 a sign suspension means cooperating with the sign and the frame, and by which the sign can be suspended on a wall, and FIG. 4 the sign and the sign suspension means in a mounted state, where the sign is shown in a partially broken away view.

DETAILED DESCRIPTION OF PREFERRED EMBODIMENTS

In a sectional view, FIG. 1 shows a sign 1 with built-in lights 2 for transmission of light through a front panel 3 of the sign. In this example, the lights include a number of light sources in the form of diode lamps. In a way known per se in this art, the sign is composed by front panel 3 made in channel plastic, connected to a rear panel 4 also made in channel plastic, and distanced from the rear panel by means of interconnecting cellular plastic elements 4. The components 2-5 mat be mutually attached by gluing, or by means of double-stick tape, e.g.

In this connection it serves to mention that the thickness of the sign is of no significance for the invention. In other words, the front and rear panels may alternatively be arranged with no empty space there between, and they may be alternatively be integrated into one singular element. The sign may for example be made from a singular sheet forming both front and rear panels in the sign.

The sign is surrounded by a band-shaped frame member 6 running about the sign, the frame 6 shown separately in FIG. 2. The frame 6 is made from an elongate and thin strip or sheet material, such as a strip of thin metal or plastic. The longitudinal edges 8 and 9 of the strip are folded in such way that when the frame is mounted on the sign, these edges reach in over the front and rear panels, respectively. The edge regions 8 and 9 form a framing on the front and rear sides of the sign, and the folding of the edge regions may be slightly overdone such that the edge regions apply a clamping force to the front and rear panels when the frame 6 is attached to the sign.

Notches 10 are formed in the edge regions 8 and 9. The notches 10 form indications for folding the frame 6, as the frame is swept about the circumference of the sign 1 upon mounting. The notches 10 are preferably made as V-shaped cuttings having an intermediate angle of 90°, this way forming mitre joints at the corners of the frame in a way illustrated in FIG. 2.

The frame 6 has a length adapted to the circumference of the sign 1, whereby the indications 10 for folding the corners 11 of the frame are positioned such that the meeting ends 12 and 13 become located opposite to the sign suspension means when mounting the sign, as will be explained below. The frame 6 may if desired be composed from several length sections, whereby it should be observed that all joints 14, 15 are positioned such that they can cooperate with a sign suspension means, respectively, in ways to be explained below with reference made to FIGS. 3 and 4.

FIG. 3 illustrates how the sign 1 and the frame 6, swept about the sign, are together inserted in a sing suspension means 16. The sign suspension means 16 comprises an upper bracket 17 and a lower bracket 18. In this embodiment the brackets 17 and 18 are interconnected through a strip 19 which is arranged to be fastened onto a wall or similar surface, such as by means of bolts screwed into the wall through the strip 19, e.g.

In this connection it serves to explain that while a wall is mentioned it equally refers to any vertical or non-vertical surface that is suitable for attaching the sign suspension means 16. Beside vertical walls, surfaces that are suitable for the purpose of the invention include pitched roofs, ceilings, columns, beams, doors, gates, or other not mentioned structures onto which the sign suspension means 16 can be mounted. Included are implementations wherein the sign suspension means is mounted to the surface/wall be means of inter-positioned distance pieces.

The brackets 17 and 18 can be separated to be mounted individually onto a wall. Preferred is however to form a sign suspension means 16 from a singular piece of material such as a sheet or strip 19 of thin material. Advantageously, the material is the same material and thickness used in the frame 16. The brackets 17, 18 are bent at 90° from the interconnecting strip, and dimensioned so as to reach from the strip 19 for at least a distance corresponding to the width of the frame 6. In a similar way, the strip 19 has a length between the bending lines at the brackets 17 and 18 that corresponds of the height of the sign 1. Through these measures, the brackets 17 and 18 may be folded up or down temporarily (see the arrow at the bracket 17) to allow insertion of the sign 1 (see the arrow pointing to the upper edge of the sign in FIG. 3) for placing the sign between the brackets 17 and 18. In addition, the brackets 17 and 18 are each preferably formed with a lip 20, respectively, the lip bent from the bracket so as to grip about the edge 8 on the front side of the sign in its inserted position.

FIG. 4 shows the sign 1 mounted in a sign suspension means 16. More precisely, FIG. 4 illustrates a cut out portion of a sign 1 comprising a front panel 3 and a rear panel 5, each made from sheets of channel plastic, the sheets distanced from each other by means of an interconnecting cellular plastic element 4. The cellular plastic element 4 is preferably arranged to run like a frame continuously along all side edges of the sign 1. On the inner side of the rear panel there is mounted a couple of ledges 21, 22 each carrying a number of diode lamps 2 forming a built in light source from which light is transmitted through the front panel 3. The necessary electronic equipment such as transformer and control unit (not illustrated) can be built into the sign, and can alternatively be placed outside the sign 1 and then connected to the built-in light source via a cable lead-through 23 arranged in the side or the rear panel of the sign.

The frame 6 runs about the circumference of the sign. The primary function of the frame 6 is to protect the cellular plastic frame and the peripheral edges of the channel plastic sheets which are located under the frame 6. The ends 12 and 13 of the frame 6 meet in a joint 14 under the upper bracket 17 of a first sign suspension means 16. If necessary, an extension section 6' of the frame 6 may be inserted between the frame ends 12 och 13, whereby a second 14 will be located under the upper bracket 17 of a second sign suspension means 16. In a corresponding way one or several extension sections 16' may be inserted in the upper side as well as in the lower side of the sign, in the structure of longer signs.

Upon mounting of the sign 1 in the sign suspension means 16, the frame ends 12 and 13 may be joined together temporarily, whereas a final fixation of the ends relative to each other is accomplished by using the bracket 17 which is coupled to both ends 12 and 13 while simultaneously clamping the sign about the circumference of the sign. This coupling can be accomplished in various optional ways, and is preferably realized in such way that the connection can be disconnected if desired for dismounting the sign from the sign suspension means. The connection between the bracket and the frame can be accomplished, e.g., by means of rivets or bolts which can be applied as indicated through reference number 24 in FIG. 4. Connection by means of bolts or rivets can alternatively be accomplished as indicated by reference number 25 in FIG. 4 according to which the side edge 8, at the region of the frame ends 12 and 13, is anchored in the lip 20 of the bracket. For completeness of disclosure it serves to mention that reference number 26 in FIG. 4 indicated holes for insertion of fastening means, such as bolts e.g., through the interconnecting strip 19 of the sign suspension means 16.

Since merely moderate forces are expected to act between the frame ends 12 and 13 in separating directions, several alternatives are available for connecting the frame with the bracket. A sufficiently strong connection can be achieved by means of a form fitting coupling, e.g., wherein supplementary shapes in the frame end the bracket/lip respectively, engage when the sign is inserted in the sign suspension means. Said formations may in alternative way be realized in the form of a snap locking means providing a disconnectable snap connection between the frame and the bracket/lip, comprising for example a hook (not illustrated) formed in the free end of the lip and arranged to grip onto the side edge 8 of the frame as the sign is inserted into the sign suspension means. By forming the brackets 17 and 18 upon bending to include a pointed angle of less than 90 between the interconnecting strip 19 and the respective bracket, the fixation of the ends of the frame and locking of the frame around the sign may alternatively be accomplished through clamping between the upper and lower brackets. In connection with smaller format signs it can be foreseen that sufficient relative fixation of the ends of the frame can be accomplished by means of magnetic locking means or though Velcro tape, when appropriate. It will also be understood that instead of bolt or rivet connections, a more strong and permanent coupling between the frame and a bracket can be realized, if required, through an adhesive joint or even by means of double-stick tape.

Through the measures explained hereinabove, an easy handling sign and sign suspension means is provided, having low weight and non-complex building requirements, and which has proven to possess a good ability to prevent the ingress of moisture and particles via joints and connections between the materials.

The invention claimed is:

1. A sign arranged for mounting on a wall, the sign comprising a rear panel (5) and a front panel (3) the peripheries of which are surrounded by a frame (6) in the form of an elongate, unitary or assembled member that runs sweeping about the sign while forming at least one joint (14) at which two ends (12, 13) of the frame meet, said sign being associated with a sign suspension means (16) comprising a bracket (17; 18) which is extended to reach folded over the frame from the rear panel upon mounting of the sign, wherein the bracket (17; 18) is arranged for coupling to each of the meeting ends (12, 13) of the frame in order to fixate the ends of the frame under the bracket while simultaneously clamping the frame (6) about the sign (1).

2. The sign of claim 1, wherein the bracket is arranged with a lip (20) which is folded towards the front panel to reach at least some distance over the front panel on the forward side of the sign.

3. The sign of claim 2, wherein the connection between the bracket and the frame comprises that said lip (20) is arranged to be coupled to an edge region (8) of the frame, which is folded to contact the outer side of the front panel.

4. The sign according to claim 1, wherein the sign suspension means (16) comprises two oppositely related brackets (17, 18), at least one of which is arranged for fixation of the ends of the frame, the brackets mutually connected through an interconnecting strip (19) which extends over the rear panel and arranged to be fastened to a wall.

5. The sign according to claim 1, wherein the connection between the bracket (17; 18) and the frame is realized in the form of one of the following ways of connection: snap lock connection, bolted connection, riveted connection, glue joint, form fitting engagement, clamp connection, Velcro tape connection, magnetic lock.

6. The sign according to claim 1, wherein the frame is made from a thin sheet, preferably a plastic sheet or a metal sheet, the longitudinal sides thereof being arranged with indications (10) for folding the frame about the sign in the form of oppositely located notches, such as V-shaped notches, the notches forming corners in a frame formed by the edge regions (8, 9) of the sheet folded inwardly over the front and rear panels, respectively, of the sign.

7. The sign according to claim 1, wherein the sign is a light panel made in low weight materials.

8. The sign according to claim 7, wherein the front panel (3) is made from channel plastic.

9. The sign according to claim 7, wherein the rear panel (5) is made from channel plastic.

10. The sign according to claim 8, wherein the front panel of channel plastic is distanced from the rear panel of channel plastic by means of interconnecting distance pieces (4).

11. The sign according to claim 1, wherein the frame (6) is made of aluminum.

12. The sign according to claim 8, wherein the rear panel (5) is made from channel plastic.

13. The sign according to claim 9, wherein the front panel of channel plastic is distanced from the rear panel of channel plastic by means of interconnecting distance pieces (4).

* * * * *